United States Patent [19]

Prim et al.

[11] 4,392,204
[45] Jul. 5, 1983

[54] LUMBER MARKING SYSTEM

[76] Inventors: David F. Prim, 4503 Mt. View, Yakima, Wash. 98901; Carl D. Greiff, 1207 N. 23rd Ave., Yakima, Wash. 98902

[21] Appl. No.: 211,705

[22] Filed: Dec. 1, 1980

[51] Int. Cl.³ .................................................. G01N 21/22
[52] U.S. Cl. .......................................... 364/478; 364/560; 144/329; 144/363; 101/93.1
[58] Field of Search ............... 364/478, 475, 560, 468, 364/518–519, 561, 562, 563, 525, 507; 144/3 N, 312, 326 R; 250/219; 101/93.1

[56] References Cited

U.S. PATENT DOCUMENTS

| | | | |
|---|---|---|---|
| 1,288,082 | 2/1918 | McDonough | 101/5 |
| 1,340,966 | 6/1921 | McDonough | 101/37 |
| 1,715,207 | 9/1929 | McDonough | 101/35 |
| 1,894,415 | 1/1933 | Onstad | 83/416 |
| 1,969,425 | 8/1934 | Richardson | 143/41 |
| 1,977,971 | 10/1934 | Payzant et al. | 143/35 |
| 2,160,307 | 5/1939 | Cleveland | 143/33 |
| 2,714,407 | 8/1955 | Pearson | 143/41 |
| 2,901,969 | 9/1959 | Rabinow | 101/93 |
| 2,918,951 | 12/1959 | Haumann | 144/3 |
| 2,923,131 | 2/1960 | Furman et al. | 60/54.5 |
| 3,007,500 | 11/1961 | Halicki et al. | 144/35 |
| 3,080,969 | 3/1963 | Blake | 209/90 |
| 3,149,562 | 9/1964 | Wilkins et al. | 101/93.10 |
| 3,158,271 | 11/1964 | Cook | 214/11 |
| 3,168,863 | 2/1965 | McRae | 101/43 |
| 3,244,204 | 4/1966 | Sherman | 143/168 |
| 3,254,764 | 6/1966 | Boyle | 209/73 |
| 3,397,403 | 8/1968 | Greene | 101/93.10 X |
| 3,459,246 | 8/1969 | Ottosson | 144/312 |
| 3,513,321 | 5/1970 | Sherman | 250/219 |
| 3,682,209 | 8/1972 | Brown, Jr. et al. | 143/41 C |
| 3,848,646 | 11/1974 | Miles | 144/3 N |
| 3,983,403 | 9/1976 | Dahlstrom et al. | 144/312 X |
| 3,992,614 | 11/1976 | Buss | 364/475 |
| 4,093,007 | 6/1978 | Hellstrom | 144/326 R |
| 4,120,333 | 10/1978 | Hellgren et al. | 144/312 |
| 4,128,345 | 12/1978 | Brady | 101/93.1 X |
| 4,152,767 | 5/1979 | Laliotis | 364/560 |
| 4,169,173 | 9/1979 | Bergholm et al. | 144/312 X |
| 4,195,346 | 3/1980 | Schroder | 364/475 |
| 4,196,648 | 4/1980 | Jones et al. | 356/386 X |
| 4,207,472 | 6/1980 | Idelsohn et al. | 144/312 X |
| 4,227,454 | 10/1980 | Speicher | 101/93.10 X |
| 4,269,245 | 5/1981 | Fornell et al. | 144/312 X |
| 4,271,477 | 6/1981 | Williams | 364/560 X |

OTHER PUBLICATIONS

IBM Technical Disclosure, Pneumatic Print Hammer, vo. 11, No. 11, Apr. 1969, p. 1606.

Primary Examiner—Edward J. Wise
Attorney, Agent, or Firm—Christensen, O'Connor, Johnson & Kindness

[57] ABSTRACT

A lumber marking system for accumulating information about pieces of lumber (e.g., boards), such as grade and volume information, and marking the end of each piece with a related code is disclosed. The boards (29) are moved by a chain/lug conveyor (11) past a series of stations. A pulse generator (45) coupled to the chain/lug conveyor (11) produces a pulse for each increment of conveyor movement. The boards (29) are moved past a console (43) where a viewing operator enters grade data. The boards also moved through a curtain of optical detectors (35), which determines in segments the maximum available length of each board. The boards also pass an optical width measuring system (47) that determines the width of each board by counting the number of pulses generated by the pulse generator (45) during the period of time that a light beam is broken by each board. The resulting grade, length and width data is collated and used to control the setting and actuation of an embossing mechanism (49) that embosses a related numerical code into the end of each board as the board reaches a position in alignment with the embossing mechanism.

13 Claims, 7 Drawing Figures

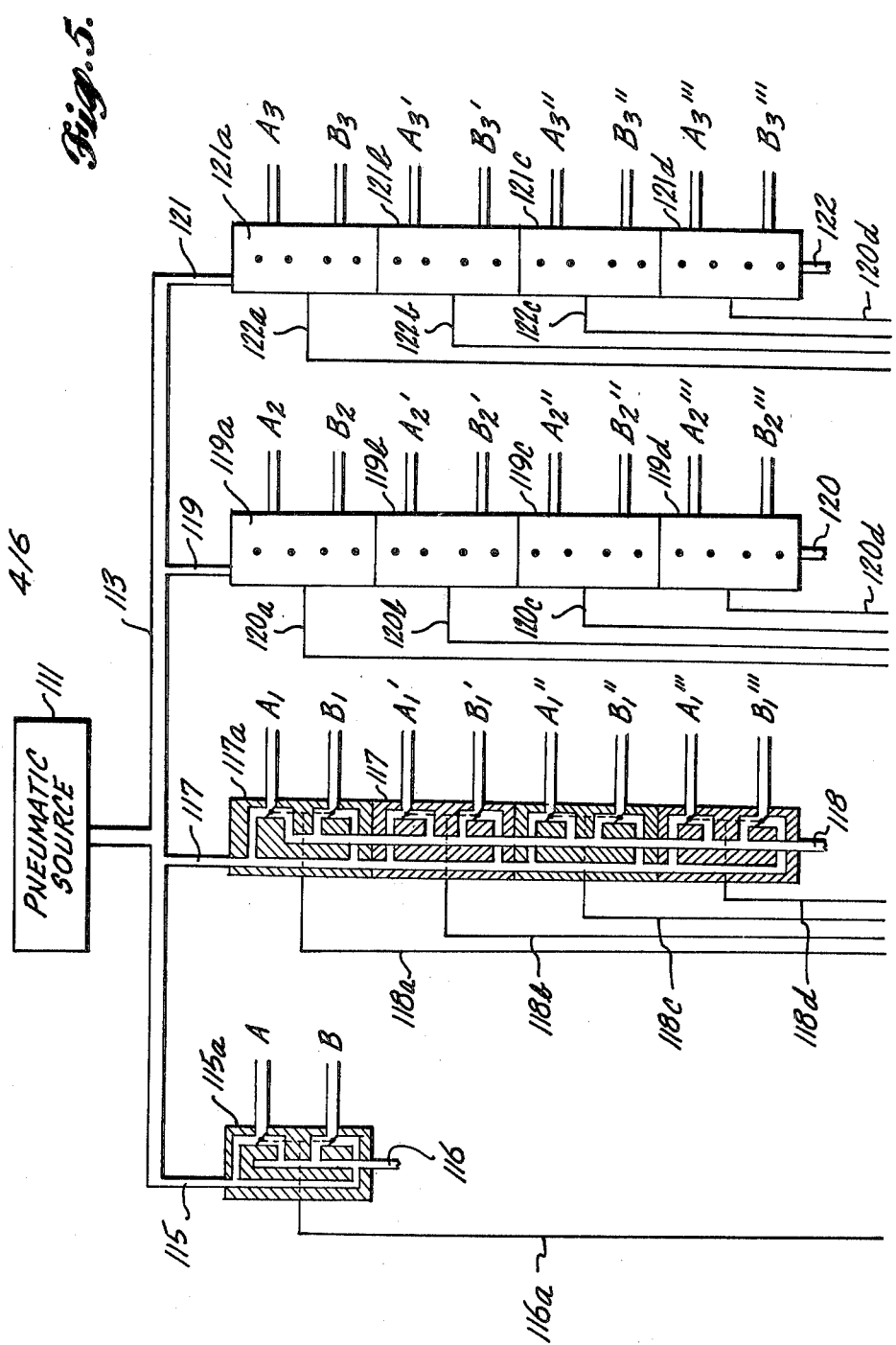

LUMBER MARKING SYSTEM

TECHNICAL AREA

This invention is directed to marking apparatus and, more particularly, lumber marking apparatus.

BACKGROUND OF THE INVENTION

In the past, a wide variety of systems have been developed for automatically handling lumber from the time a log enters a lumber mill until the time rough or finished boards leave the mill. More specifically, a wide variety of systems have been developed for automatically moving boards from one milling operation to the next starting from the time a log enters a mill and ending when rough (or finished) boards leave the mill. Many such systems include provisions for grading boards after they have been milled to size, prior to the boards leaving the mill. In most systems that provide for lumber grading, a trained person views uniform size boards and determines their grade. The resulting grade information may be used to collate boards of the same size, either manually or automatically. After the boards are collated according to grade and size, grade and size information is applied, usually by hand, to the boards.

While prior art systems of the type generally described above are useful when the boards are uniform in dimension and collated by grade prior to marking, such systems are not useful in situations where the boards are of nonuniform size and grade, whereby each board must have its grade and size separately determined and, then, each board must be separately marked. In this regard, boards of nonuniform grade and size are usually obtained from trees that are scarce, yet have highly desirable wood, such as walnut, oak, etc. It is the desire to obtain the maximum amount of wood from such trees that result in their being milled into nonuniformly sized boards. Furniture lumber is frequently produced in such a manner. The only sizing of such lumber is the cutting of random length rough cut boards to fixed lengths using a trimming saw system. The trimming saw system includes a plurality of positionable trimming saws each having a cutting plane lying parallel to the direction of movement of a conveyor moving the boards. The trimming saws may be mounted above or below the conveyor and are independently movable into a position suitable for cutting the moving boards to length. Which saw is positioned for cutting is either manually determined by an operator or, in some systems, automatically determined by a control system that obtains data about the boards from sensors mounted transverse to the direction of board movement, upstream of the position of the trimming saws. The control system uses the sensed length information to control the saws and, thus, the ultimate length of the boards in step increments.

Regardless of how lumber is milled, or data, such as grade, length, width and thickness, is determined, it is often necessary to encode certain lumber information onto the board. If this is required for each board, the data must be accumulated on a board-by-board basis. Obviously, the manual collation of this information and, then, the manual application of the resulting data to each board is time consuming and, thus, costly. As a result, it would be desirable to provide a system for automatically collating such information and, then, automatically marking the information on each board of a series of boards.

Therefore, it is an object of this invention to provide a system for automatically accumulating and collating selected data about boards.

It is another object of this invention to provide a system for automatically accumulating and collating selected data about boards and applying a related code to the boards.

It is also an object of this invention to provide a system for automatically accumulating and collating selected data about random length boards and applying a related code to the boards on a piece-by-piece basis.

It is a further object of this invention to provide a lumber marking system for automatically determined information about the volume of boards and collating this information with information about the grade of the boards and controlling a lumber marking mechanism for marking a related code on the edge of each board.

One of the reasons why the prior art has failed to provide a suitable system for automatically collating information about boards on a piece-by-piece basis and applying a suitable code to each board, results from the lack of a suitable mechanism for applying code marks to the boards. In this regard, uniformly, prior art lumber marking mechanisms are manually adjustable. In such marking mechanisms each time a new code is to be applied, the marking mechanism must be manually set to the new code. The disadvantage of such devices is, of course, the requirement that system operation be stopped each time a new code is to be applied. System shutdown is particularly time consuming and, thus, expensive in environments where a different code may have to be applied to each board. Previously this disadvantage has been prevalent both with print type marking devices and embossing type marking devices.

Consequently, it is also an object of this invention to provide a new and improved marking apparatus that is readily controlled by a control system such that each board in a series can be marked on a piece-by-piece basis, without system shutdown.

It is a further object of this invention to provide a new and improved embossing mechanism that is readily controllable by a control system such that a different code can be embossed into the edge of boards on a piece-by-piece basis without system shutdown.

SUMMARY OF THE INVENTION

In accordance with this invention a lumber marking system is provided. The system marks the edge of boards on a piece-by-piece basis (if required) with selected information, such as a grade and volume code. The boards to be marked or encoded are moved past stations where the required information is developed. The stations may include an operator viewing station whereat an operator enters grade information, a lumber length station whereat the length of the lumber is sensed and a lumber width station whereat the width of the lumber is sensed. The resultant information for each board is collated, and used to control a marking apparatus that marks a code on the end of each board based on the collated information.

In accordance with the further principles of this invention, a chain/lug conveyor system transversely moves the boards and a pulse generator coupled to the chain/lug conveyor produces a stream of pulses as the boards are moved. Each pulse represents a predetermined increment of conveyor movement. The pulses are utilized to control the collating of information about each board and controlling the setting and actuation of the marking apparatus so that each board is appropriately marked when it reaches the location of the marking apparatus.

In accordance with further principles of this invention, the length of the lumber is sensed by passing the lumber transversely through a curtain of length detectors, such as a curtain of optical detectors. The length information may also be utilized to control a lumber milling machine, such as in a trimming saw, in a conventional manner, if desired.

In accordance with still further principles of this invention, the width of the boards is determined by transversely passing the boards through a light beam that lies transverse to the plane of board movement, and counting the number of pulses produced by the pulse generator during the period of time that the light beam is broken by each board.

In accordance with other principles of this invention the marking apparatus is an embossing mechanism that includes one or more columns of marking elements that are position adjustable. The columns of marking elements lie between a striker and the edge of the boards to be marked. The striker is, of course, aligned with, and movable toward the edge to be marked. Preferably, the position of the marking elements in each column is controlled by a pneumatic system. More specifically, the pneumatic system moves the element columns up and down between the striker and the edge of the boards. Just prior to a board reaching a point in alignment with the striker, the pneumatic system positions the desired marking elements in line with the striker. When the board reaches a position in alignment with the striker, the striker is actuated to drive the aligned marking elements toward the board edge. As a result, an embossed code is created in the edge of the board. Preferably, each of the marking elements is spring-loaded and, as a result, returns to a retracted position when the striker is retracted.

In accordance with still other principles of this invention, an electronic control system is provided for accumulating the various pieces of data utilized to control the position of the marking elements. The electronic control system is synchronized by pulses produced by the chain/lug conveyor, so that all of the information related to a particular board is combined and utilized to position of the marking elements immediately prior to the related board reaching a position in alignment with the striker.

As will be readily appreciated from the foregoing description, the invention provides a lumber marking system suitable for accumulating information about individual boards on a piece-by-piece basis and embossing a related code into the edge of the boards. In addition, the invention provides a new and improved embossing mechanism that is readily controlled by an automatic control system, such as an electronic data accumulation system. While the embossing mechanism was developed for use in the lumber marking system of the invention, it is to be understood that the embossing mechanism can be utilized with other lumber marking systems and to mark items other than pieces of lumber.

BRIEF DESCRIPTION OF THE DRAWINGS

The foregoing objects and many of the attendant advantages of this invention will be more readily appreciated as the same becomes better understood by reference to the following detailed description when taken in conjunction with the accompanying drawings wherein:

FIG. 5 is a schematic diagram of an electro-pneumatic system suitable for use in controlling the operation of the embossing mechanism illustrated in FIGS. 2-4;

DESCRIPTION OF THE PREFERRED EMBODIMENT

Figure 1:
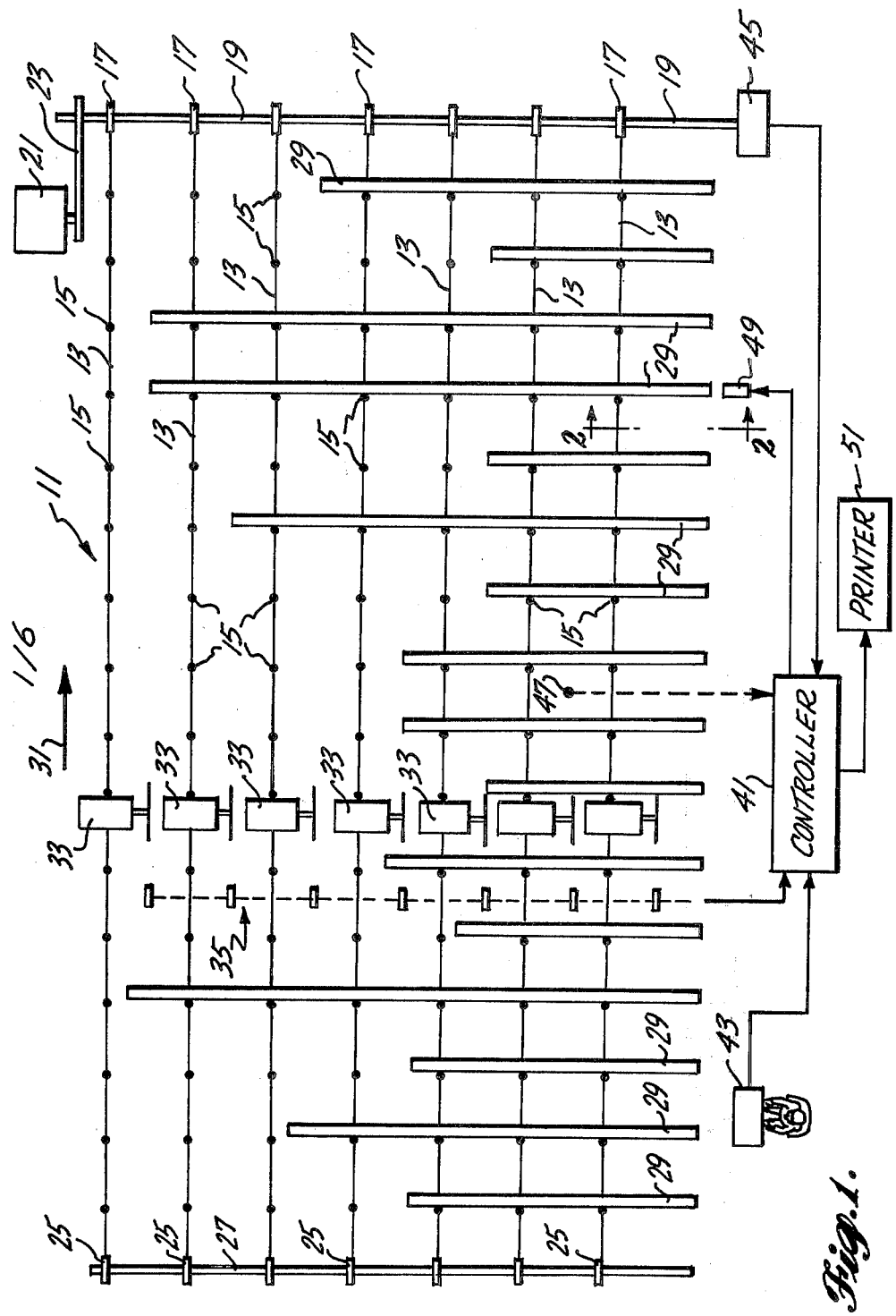
FIG. 1 is a schematic diagram of a lumber marking system formed in accordance with the invention combined with a trimming saw.

FIG. 1 illustrates a lumber marking system formed in accordance with the invention combined with a trimming saw. More specifically, FIG. 1 illustrates a chain/lug conveyor 11 comprising a plurality of parallel, continuous chains 13. Mounted on the chains at predetermined intervals are a plurality of lugs 15. The lugs of the individual chains define lines that lie orthogonal to the longitudinal axes of the chains 13. Each of the chains 13 moves in a path of travel defined by an elongate loop having upper and lower runs. The loop at one end of each chain wraps around a drive sprocket 17. The drive sprockets 17 are all mounted on a common drive shaft 19 rotated by an electric motor 21. The motor 21 is connected to the drive shaft 19 by a suitable drive chain/sprocket mechanism 23. The loops in the other ends of the chain 13 wrap around idler sprockets 25 mounted on a common idler shaft 27. While not shown, the bottom side of the upper run of the chains may be supported by suitable support mechanisms.

The lugs 15 project outwardly from the chains and impinge on the trailing edge of boards 29, which are moved by the upper run of the chain/lug conveyor 11 in the direction of the arrow 31, i.e., from the idler shaft 27 toward the drive shaft 19. More specifically, the boards 29 are picked up by the chain/lug conveyor from a source (not shown) near the idler shaft 27 and are moved by the upper run of the chain/lug conveyor toward the drive shaft 19 where they leave the conveyor. The boards span at least two chains and are moved in a direction transverse to their longitudinal axes.

Mounted orthogonal to the direction of movement of the boards 29, midway between the drive shaft 19 and the idler shaft 27, are a plurality of trimming saws 33. Each of the trimming saws 33 includes a motor driving a disc-type saw blade. The trimming saws 33 may be mounted above or below the plane of the upper run of the chain/lug conveyor 11. The disc-type saw blades of the trimming saws 33 lie in planes orthogonal to the plane of movement of the chain/lug conveyor 11, but parallel to the direction of movement, i.e., parallel to the arrow 31.

Located upstream of the trimming saws 33 is a curtain of optical detectors (e.g., light switches) 35. More specifically, the curtain of optical detectors 35 is formed by a plurality of spaced apart optical detector elements each of which includes a light source and a photodetector. The curtain lies transverse to the direction of movement of the chain/lug conveyor 11. Thus, the curtain of optical detectors lies parallel to the trimming saws 33. Moreover, the light beam of an optical detector is coplanar with the blade of each trimming saw 33. Thus, the axes of the light beams of the optical detectors are transverse to the plane of movement of the upper run of the chain/lug conveyor 11, as well as aligned with a related saw blade.

At this point it should be noted that the foregoing description has described a conventional trimming saw system. That is, a conventional trimming saw system includes a chain/lug conveyor for moving boards past a plurality of trimming saws. The trimming saws may be located above or below the plane of movement of the boards. Each of the individual trimming saws is raisable or lowerable so as to move its blade into the path of travel of the boards. Such movement may be manually or automatically controlled. In the case of manual movement an operator selects which saw is to be moved into the path of travel of a board approaching the trimming saws. As required, the selected saw is moved upwardly or downwardly. If not previously energized, the saw motor is simultaneously energized. Thereafter, when the conveyor moves the board into alignment with the trimming saws, the selected saw trims one end of the board. While, two trimming saws could be simultaneously actuated to trim both ends of the board, in most instances, one end of the board is located at a fixed position, illustrated as the lower or right-most end of the chain/lug conveyor in FIG. 1.

In the case of manual operation the curtain of optical detectors 35 is not required. Contrariwise, in the case of an automatically controlled trimming saw system, either optical detectors, mechanical switches or some other type of length sensors are provided upstream of the trimming saws. The length sensors detect the maximum length of the lumber that can be cut to a predetermined length as each board approaches the trimming saws. In accordance with this information the trimming saw that will result in the maximum length of board (based on length segments, e.g., eight foot, ten foot, etc.) is positioned to cut the board to length. A control system for accomplishing this result is not illustrated in FIG. 1.

As will be better understood from the following description, a lumber marking system formed in accordance with the invention, when combined with a trimming saw system, uses part of the conventional trimming saw system to develop information that is usable by the lumber marking system to control the marking of individual boards. Of course, it is to be understood that a lumber marking system formed in accordance with the invention also could take the form of a "stand alone" system; or, be combined with other types of lumber milling systems.

In any event, in accordance with the invention, in addition to the trimming saw system illustrated in FIG. 1, FIG. 1 also includes, in accordance with the invention: a controller 41; an operator console 43; a pulse generator 45; a width detector 47; an embossing mechanism 49; and, a printer 51. For purposes of illustration the operator console 43 is positioned downstream of the curtain of optical detectors 35 and oriented such that an operator sitting at the operator console 43 can observe the pieces of lumbers moved by the chain/lug conveyor. In accordance with his observations the operator actuates a keyboard forming part of the operator console 43. The keyboard information inserted by the operator denotes the grade of the board based on the board defects (e.g., knots, twists, grain, etc.) observed by the operator. The operator may also insert other information via the keyboard, such as board type (e.g., oak, walnut, etc.), board thickness, etc. The keyboard information created by the operator is read by the controller 41, which is connected to the operator console 43. The controller 41 also receives board length information from the curtain of optical detectors 35, based on which optical detector beams are broken by each board.

The pulse generator 45 is connected to the drive shaft 19 and produces a pulse for each predetermined increment of movement of the drive shaft and, thus, the chain/lug conveyor 11. As will be better understood from the following descriptions, the pulse generator 45 may also produce a second train of pulses, one of which occurs each time the chain/lug conveyor 11 moves a distance equal to the distance between an adjacent pair of lugs 15 (which are equally spaced apart on the chains).

The width detector 47 comprises a light source that emits a vertical light beam and an aligned light detector. The beam is positioned downstream of the trimming saws 33 and located such that the beam is broken by each board. The light detector of the width detector is also connected to the controller 41. The width detector 47 operates in combination with the pulse generator 45 to determine the width of each board breaking the light beam of the width detector. More specifically, as will be better understood from the following description, the light detector output of the width detector 47 enables a counter that counts pulses produced by the pulse generator during the period of time that the light beam of the width detector is broken by a board. As a result, the number of pulses counted is directly related to the width of the board.

The controller 41 collates the information produced by the various data sources, e.g., the curtain of optical detectors 35, the operator's console 43 and the width detector 47. In accordance therewith, the controller 41 controls the operation of the embossing mechanism 49; and, the printer 51. More specifically, the information provided by the curtain of optical detectors 35 defines the length of each board, in a segmented manner. (The same information is utilized to control the positioning and energization of the appropriate trimming saw 33, as previously described.) The grade (and other) information inserted by the operator into the operator's console 43 defines the grade of each board (and other desired information). Finally, the width detector 47 in combination with the pulse generator 45 defines the width of each board. The controller collates all of this information for each board. Then, the controller controls the embossing mechanism 49 such that a code related to the collated information is embossed into the end of each board as the board reaches a position in alignment with the embossing mechanism 49. The same and/or other information may be simultaneously applied to the printer 51. Alternatively, the controller may store the desired information about each board until a printout request is received from the operator's console 43, the printer 51, a separate operator input terminal, switch, etc.

Figure 2:
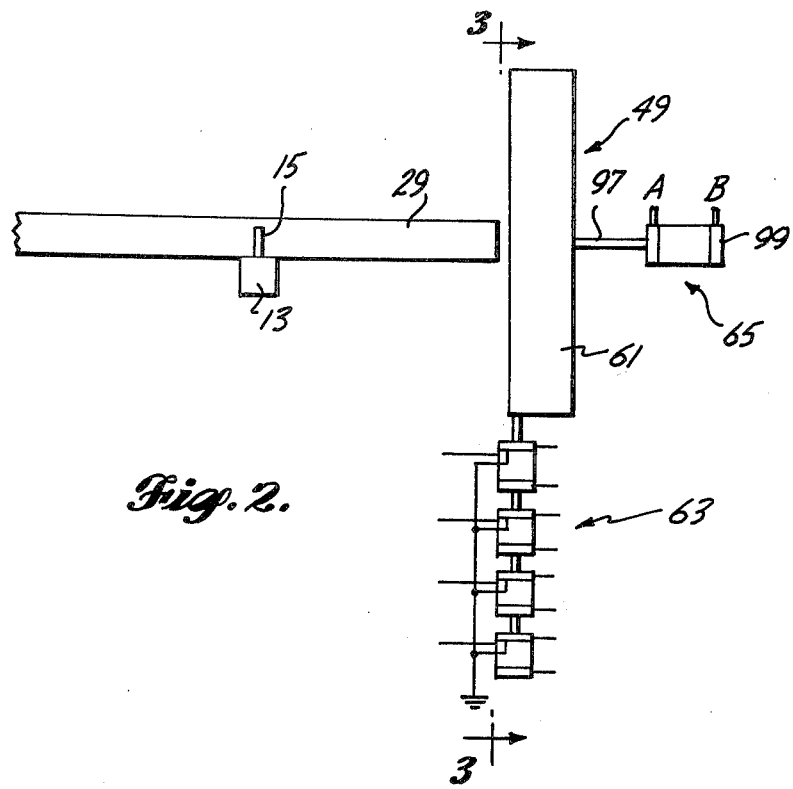
FIG. 2 is an elevational view of an embossing mechanism formed in accordance with the invention.
Figure 4:
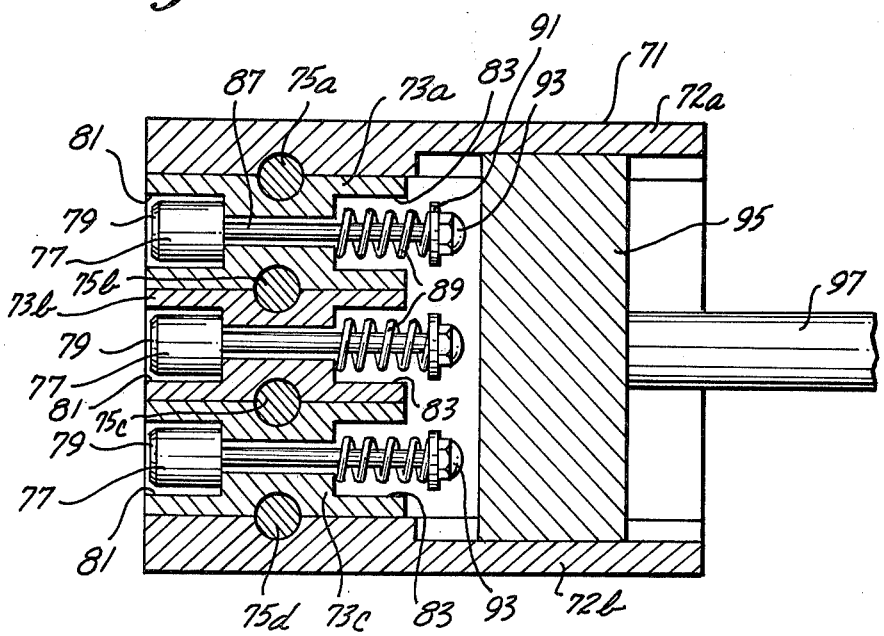
FIG. 4 is a cross-sectional view along line 4—4 of FIG. 3.
Figure 3:
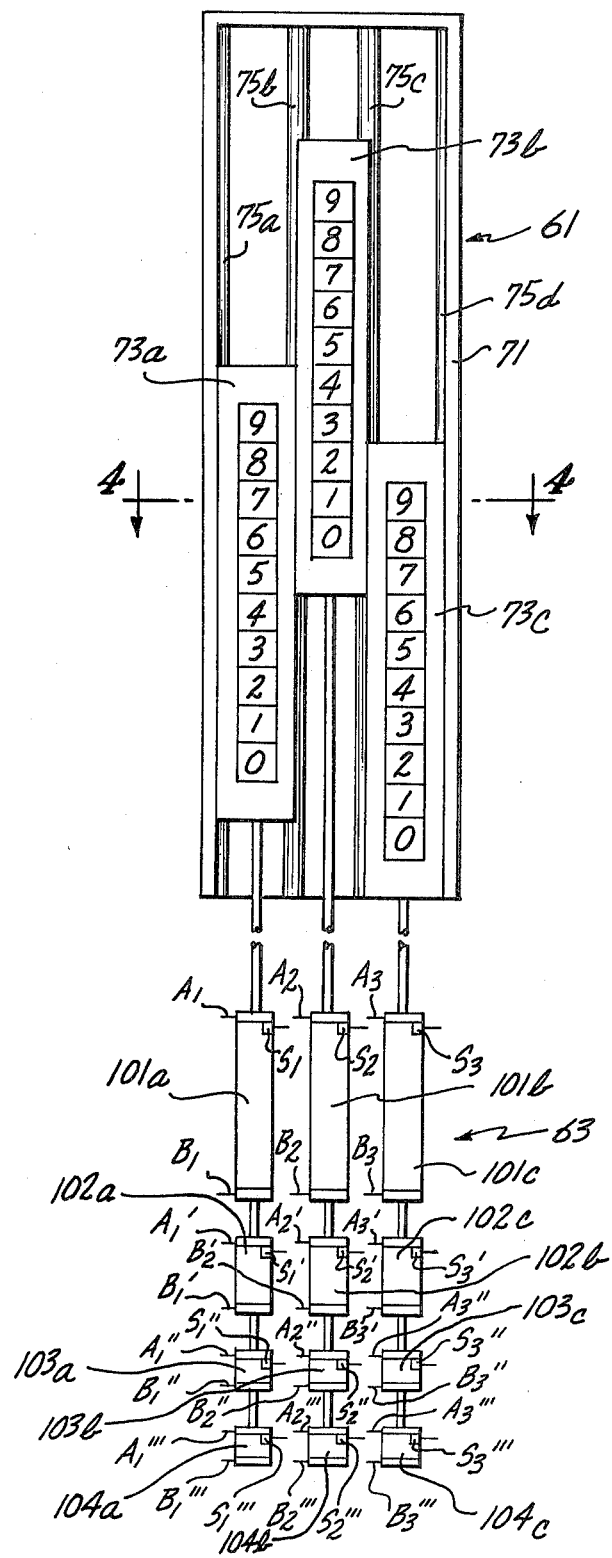
FIG. 3 is an elevational view along line 3—3 of the embossing mechanism illustrated in FIG. 2.

FIGS. 2-4 illustrate an embossing mechanism 49 formed in accordance with the invention suitable for use in the lumber marking system illustrated in FIG. 1. As best illustrated in FIG. 2, the major subsystems of an embossing mechanism 49 formed in accordance with the invention comprise: a marker mechanism 61; a positioning mechanism 63; and, a striking mechanism 65. The marker mechanism 61 comprises a plurality of vertically oriented columns of marking elements. The vertical position of each column is controlled by the positioning mechanism 63. The striking mechanism 65 is aligned with the plane of movement of the boards 29. Further, the marker mechanism 61 is located between the striking mechanism 65 and the boards along the base edge (e.g., the right or bottom edge in FIG. 1) of the chain/lug conveyor 11. In operation, the positioning mechanism 63 positions the appropriate marking elements of each column of the marker mechanism 61 in alignment with the striking mechanism 65 as each board approaches the location of the embossing mechanism 49, based on the nature of the control signals produced by the controller 41. When the related board reaches a position in alignment with the striking mechanism 65, the striking mechanism 65 is actuated. Actuation of the striking mechanism drives the aligned marking elements against the end of the board 29.

As best illustrated in FIG. 3, the marker mechanism 61 includes a vertically oriented elongate housing 71. The wall of the housing facing the boards 29, defined as the front wall, is uncovered. In addition, the wall of the housing opposed to the wall facing the boards, i.e., the back wall, includes an aperture aligned with the plane of movement of the boards 29. Mounted in the housing 71 are three vertically oriented, elongate slide blocks 73a, b and c. The slide blocks 73a, b and c are maintained in side-by-side vertical alignment by four guide rods 75a–d. The first and fourth guide rods 75a and d are mounted between the side walls 72a and b of the housing 71 and the first and third slide blocks 73a and 73c, respectively, as best illustrated in FIG. 4. The second and third guide rods 75b and 75c are positioned between the first and second slide blocks 73a and 73b and the second and third slide blocks 73b and 73c, respectively. While maintained in vertical alignment by the guide rods 75a–d, each of the slide blocks 73a–c is independently vertically position adjustable.

Each slide block 73a–c supports a column of ten marking elements 77, each of which includes a raised type font 79. More specifically, each of the slide blocks 73a–c includes a vertically oriented elongate recess 81 in the side of the slide block facing the open front wall of the housing 71. Thus, the elongate recesses face the boards 29. A similar vertically oriented elongate recess 83 is formed in the side of the slide blocks 73a–c opposed to the side facing the open front wall of the housing. Extending between the vertically oriented elongate recesses 81 and 83 of each slide block 73a–c are ten cylindrical apertures 85. The diameter of the cylindrical apertures is substantially less than the horizontal width of the vertically oriented elongate recesses 81 and 83.

Each of the marking elements 77 includes an enlarged head having a vertical face in which one of the type fonts 79 is formed. As noted above, in the illustrated embodiment of the invention each column includes ten marking elements 77. The type font on the marking elements is raised and each column includes the numerals zero through nine. The type fonts lie in the plane of the open or front wall of the housing 71.

The heads of the marking elements lie in the recess 81 in the slide blocks facing the boards 29. Extending outwardly from the side of the head of the marking elements 77, remote from the side in which the type fonts 79 are formed, are integral rods 87. One rod is mounted at each of the cylindrical apertures 85 in the slide blocks 73a–c. The rods 87 extend into the recesses 83 formed in the sides of the slide blocks 73a–c opposed to the side facing the boards 29.

Mounted on each of the rods 87 and lying in the recess 83 is a coil spring 89. One end of the coil spring 83 impinges on the inner wall of the recess 83. The other end impinges on one face of a washer 91 mounted on the end of each of the rods 87. The other face of the washers 91 impinge on retaining nuts 93 threaded onto (or otherwise affixed to) the outer ends of the rods 87. The force produced by the springs 83 is such that, in the absence of an adequate spring compression force being applied to the nuts 93, the heads of the marking elements 77 are retracted into the recess 81 formed in the wall of the slide blocks facing the boards.

The striking mechanism 65 includes: a head 95; a shaft 97; and, a double acting pneumatic actuator 99. The shaft 97 is connected to (or an extension of) the shaft of the double acting pneumatic actuator 99 and lies in the plane of movement of the boards 29 and at right angles to the direction of movement of the boards. More specifically, when the end of a board lies in alignment with the marker mechanism 61, the longitudinal axis of the board 29 is aligned with the longitudinal axis of the shaft 97 of the striking mechanism 65 (or, slightly offset therefrom, depending upon the width of the board). The head 95 is mounted on the outer end of the shaft 97, i.e., the end remote from the pneumatic actuator end. The head 95 is mounted in the aperture formed in the back wall of the housing 71. The head 95 is illustrated as wide enough to horizontally span all of the slide blocks 73a–c and, thus, the nuts 93 of all three columns of marking elements 77. The head 95 also lies in the plane of movement of the boards 29.

The pneumatic actuator 99 receives pneumatic force produced in the manner hereinafter described at inlet/outlet ports identified by the letters A and B in FIG. 2. The ports provide access to the chambers located in the opposite sides of the piston of the pneumatic actuator 99 and are denoted as inlet/outlet ports because when port A acts as an inlet and receives pneumatic pressure, port B acts as an outlet for its chamber and vice versa. In this regard, shaft 97 is withdrawn, i.e., moved away from the marker elements 77 when port A acts as an inlet and port B acts as an outlet. Contrariwise, when port B acts as an inlet and port A acts as an outlet, the actuator via the shaft 97 drives the head 95 against the aligned marking elements 77. The drive force is adequate to propel the font ends of the marking elements into the aligned end of a board 29 to create an embossed code in the end. More specifically, as discussed above, the head 95 is vertically aligned with the plane of movement of the boards 29. As each board 29 reaches a predetermined position, its end is aligned with the head 95. When this position is reached, the fonts in the horizontal array of marking elements 77 then aligned with the head 95 are driven into the end of the board by the head, in response to the application of pneumatic pressure to inlet/outlet port B of the pneumatic actuator 99. As a result, the piece of lumber is "marked" with an embossed array of numbers. The embossed numbers form a code that contains information about that particular board—grade and volume information in the illustrated and described embodiment of the invention.

As best illustrated in FIGS. 2 and 3, the positioning mechanism 63 includes three stacks of pneumatic cylinders. For purposes of description only, it is assumed that the center-to-center spacing between the type fonts 79 of the marking elements 77 is one inch. Consequently, one inch of vertical movement raises (or lowers) each character column by one type font position. In order to move an entire column a minimum of nine one-inch movement increments is required of the positioning mechanism. Each stack of the positioning mechanism 63 of the illustrated embodiment of the invention includes four double acting pneumatic actuators sized and positioned to provide nine one-inch movement increments. In this regard, one pneumatic actuator 101a-c of each stack has a five-inch throw, i.e., its shaft moves five inches; the second pneumatic actuator 102a-c has a two-inch throw; and, each of the other two pneumatic actuators 103a-c and 104a-c have one-inch throws. Moreover, the shafts of the actuators are either fully extended or fully retracted, i.e., they have no intermediate operative positions. While the pneumatic actuators of each stack can be arrayed in various manners, in the illustrated embodiment of the invention, the bottom actuator of each stack is a one-inch actuator 104a-c. Mounted atop the shaft of the bottom one-inch actuator is the second one-inch actuator 103a-c. Mounted atop the shaft of the second one-inch actuator is the two-inch actuator 102a-c; and, mounted atop the shaft of the two-inch actuator is the five-inch actuator 101a-c. Mounted atop the shaft of the five-inch actuator is the slide block 73a-c of an associated character column.

When the shaft of any actuator is extended, all of the actuators above it, and the related slide block, are raised by one, two or five inches, depending upon the nature of the actuator whose shaft is extended. Further any combination of actuators, including all or none of the actuators can have their shafts simultaneously extended (or retracted) since any number between one (1) and nine (9) can be formed by various combinations of the digits 1, 1, 2 and 5, the pneumatic actuators can be controlled at one-inch intervals to position any marking element of each column in alignment with the head 95.

As with the pneumatic actuator 99 of the striking mechanism 65, located at each end of each stack pneumatic actuator is an inlet/outlet port that provides access to the chambers on the opposite sides of the piston of the actuator. When one inlet/outlet port functions as an inlet, the other functions as an outlet port and vice versa. For purposes of description, the inlet/outlet ports are generally defined by the letters A and B and specifically defined by subscripts and primes. The stack pneumatic actuators are positioned such that the A inlet/outlet ports are located at the upper ends of the pneumatic actuators and the B inlet/outlet ports are located at the lower ends. Thus, when the A inlet/outlet ports receive pressure from a suitable pneumatic source, the shaft of the related actuator is retracted. Contrariwise, when the B inlet/outlet ports receive pressure from a suitable pneumatic source the shaft of the related actuator is extended.

As noted above for purposes of identification, the A and B inlet/outlet ports have associated subscripts and (in some cases) prime notations. In this regard, the inlet/outlet ports of the pneumatic actuators 101a, 102a, 103a and 104b forming the first stack all have a subscript 1; the inlet/outlet ports of the pneumatic actuators 101b, 102b, 103b and 104b forming the second stack all have the subscript 2; and the inlet/outlet ports of the pneumatic actuators 101c, 102c, 103c and 104c forming the third stack all have the subscript 3. In addition, while none of the five-inch inlet/outlet ports include a prime, the two-inch inlet/outlet ports all have a single prime ('); the upper one-inch inlet/outlet ports all have a double prime (''); and, the bottom one-inch inlet/outlet ports all have a triple prime ('''). Thus, for example, the inlet/outlet ports of the five-inch pneumatic actuator 101a of the first stack are denoted $A_1$ and $B_1$; the inlet/outlet ports of the two-inch pneumatic actuator 102a of the first stack are denoted $A_1'$ and $B_1'$; the inlet/outlet ports of the upper one-inch pneumatic actuator 103a of the first stack are denoted $A_1''$ and $B_1''$; and, the inlet/outlet ports of the lower one-inch pneumatic actuator 104a of the first stack are denoted $A_1'''$ and $B_1'''$.

Located near the upper end of the cylinders of each of the stack pneumatic actuators is a normally open switch that is closed only when the shaft of the related actuator is fully extended. The switch associated with the five-inch pneumatic actuator 101a of the first stack is denoted $S_1$; the switch associated with the two-inch pneumatic actuator 102a of the first stack is denoted $S_1'$; the switch associated with the upper one-inch pneumatic actuator 103a of the first stack is denoted $S_1''$; and, the switch associated with the lower one-inch pneumatic actuator 104a of the first stack is denoted $S_1'''$. Similar identification nomenclature is utilized to denote the switches associated with the pneumatic actuators of the second and third columns, except that the subscripts are 2 and 3, respectively, rather than 1.

FIG. 5 is a schematic diagram illustrating an electropneumatic distribution system for selectively applying pressure to the inlet/outlet ports of the positioning mechanism pneumatic actuator 101a-c, 102a-c, 103a-c and 104a-c (FIG. 4) and the striking mechanism pneumatic actuator 99 (FIG. 2). More specifically, FIG. 5 illustrates a pneumatic (pressure) source 111 connected by a main distribution tube 113 to four inlet tubes 115, 117, 119 and 121. The first inlet tube 115 is connected to the inlet of an electrically operated pneumatic valve 115a; and an outlet tube 116 is connected to the outlet of the valve 115a. The valve 115a has two common ports denoted A and B, respectively. The A and B common ports are connected to the A and B inlet/outlet ports, respectively, of the pneumatic actuator 99 of the striking mechanism illustrated in FIG. 2 and heretofore described.

As schematically illustrated the common ports of the valve 115a can be connected to either inlet tube 115 or outlet tube 116. Further, the valve has two complementary states. When one common port is connected to inlet tube 115 the other common port is connected to outlet tube 116 and vice versa. Moreover, the state of the valve is controlled by the state of a binary control signal applied to the valve 115a via a control wire 116a. More specifically, the valve 115a is spring loaded such that it normally is in one of its two complementary states. When a suitable signal is applied to the valve via control wire 116a a coil is energized and the valve is switched to its other state. In summary, when one of the common ports (A) is connected to the inlet tube 115, the other common port (B) is connected to the outlet tube 116 (as schematically illustrated in FIG. 5) and vice versa. The state of the valve is controlled by the binary state (e.g., high or low) of a control signal applied to the valve via the control wire 116a. When the binary state is low, the valve is in its normal state. When the binary state is high the valve spring bias is overcome and the valve switches to its other or abnormal state.

As a result of the foregoing arrangement, when pressure is applied to the B inlet/outlet port of the pneumatic actuator 99 of the striking mechanism to create an embossing force, gas is automatically exhausted from the A inlet/outlet port. Contrariwise, after an embossing force has been produced, and the head 95 is being withdrawn as the result of pressure being applied to the A inlet/outlet port of pneumatic actuator 99, gas is automatically exhausted from the B inlet/outlet port.

A similar arrangement is utilized to control the application of pneumatic pressure to the pneumatic actuators that control the positioning of the marking elements. In this regard, inlet tube 117 is connected to four electrically operated pneumatic valves designated 117a–d; inlet tube 119 is connected to four electrically operated pneumatic valves designated 119a–d; and, inlet tube 121 is connected to four electrically operated pneumatic valves designated 121a–d. In addition, electrically operated pneumatic valves 117a–d are connected to an outlet tube 118; electrically operated pneumatic valves 119a–d are connected to an outlet tube 120; and, electrically operated pneumatic valves 121a–d are connected to an outlet tube 122.

Since the operation of the three sets of four electrically operated pneumatic valves is identical, only the operation of the first set, i.e., the set connected to inlet tube 117 and outlet tube 118 is shown in detail in FIG. 5 and hereinafter described. This set of electrically operated pneumatic valves 117a–d is connected to control the operation of the first stack of pneumatic actuators 101a, 102a, 103a and 104a. The first valve 117a has common ports designated $A_1$ and $B_1$, respectively. The common ports are connected to the $A_1$ and $B_1$ inlet/outlet ports of the five-inch pneumatic actuator 101a of the first stack. The second electrically operated pneumatic valve 117b has common ports designated $A_1'$ and $B_1'$, respectively, which are connected to the $A_1'$ and $B_1'$ inlet/outlet ports of the two-inch pneumatic actuator 102a of the first stack. The third electrically operated pneumatic valve 117c has common ports designated $A_1''$ and $B_1''$, respectively, which are connected to the $A_1''$ and $B_1''$ inlet/outlet ports of the upper one-inch actuator 103a of the first stack. Finally, the fourth electrically operated pneumatic valve 117d has common ports denoted $A_1'''$ and $B_1'''$, which are connected to the $A_1'''$ and $B_1'''$ inlet/outlet ports of the lower one-inch actuator 104a of the first stack of pneumatic actuators. As with valve 115a, the valves 117a–d connected to the four actuators of the first stack of pneumatic actuators are spring loaded and are always in complementary states, i.e., when one common port is connected to the inlet tube 117 the other common port is connected to the outlet tube 118. The state of the valves are controlled by the binary state of control signals carried by wires 118a–d, which are connected to valves 117a–d, respectively. As a result of this arrangement, each of the four pneumatic actuators forming each stack of pneumatic actuators is independently controlled. Thus, as previously described, the pneumatic actuators can be controlled to selectively position their associated column of marking elements in one-inch step increments. Consequently, any individual marking element can be located in line with the head 95.

As previously noted, the nature, connection and operation of the four electrically operated pneumatic valves forming the two other sets, 119a–d and 121a–d, respectively, are identical to the electrically operated pneumatic valves 117a–d previously described. Thus, the nature, connection and operation of these valves will not be described in detail, except to note that the position of valves 119a–d are controlled by the binary state of control signals on wires 120a–d; and, the position of valves 121a–d are controlled by the binary state of control signals on wires 122a–d.

Figure 6:
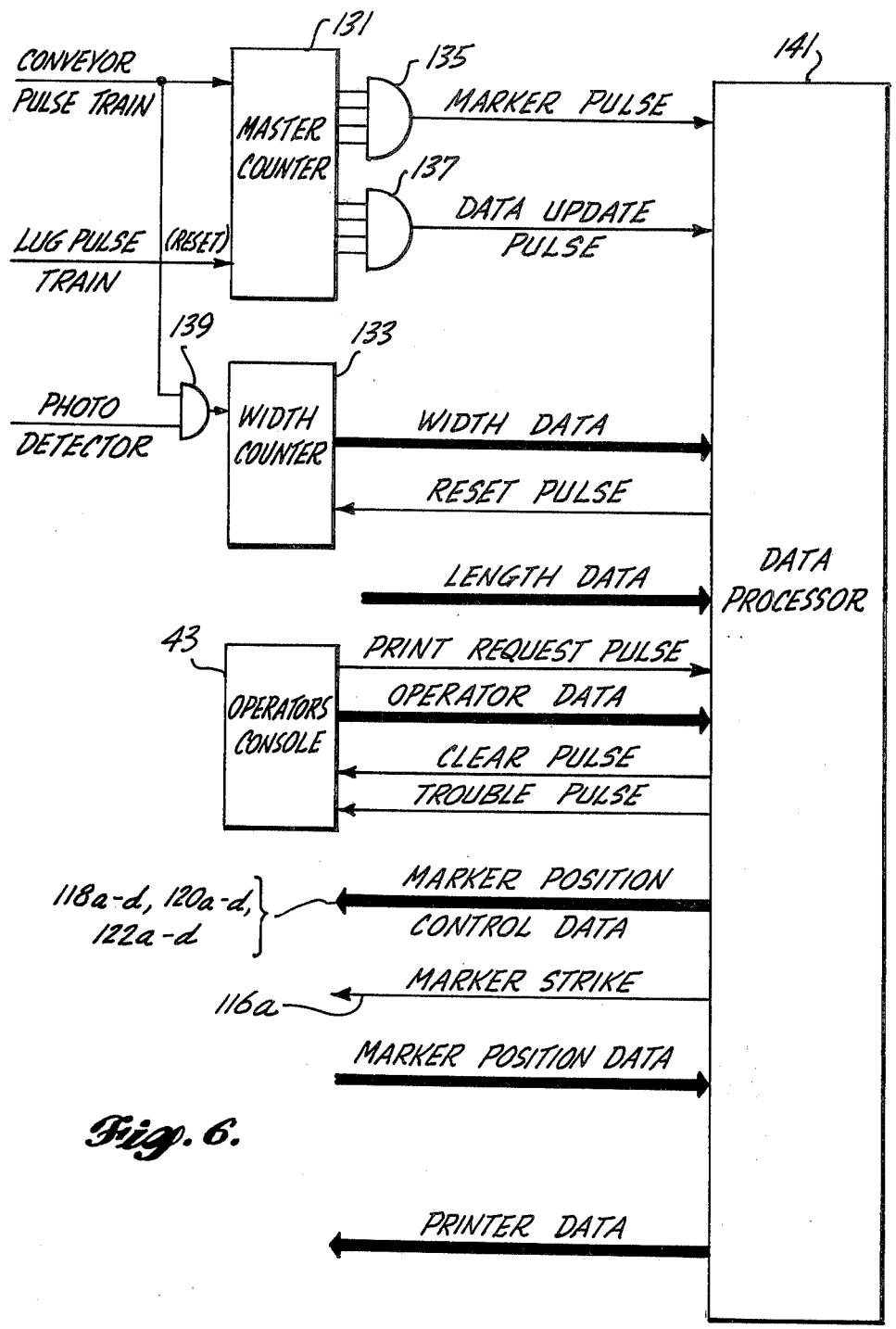
FIG. 6 is a block diagram of a controller suitable for use in the lumber marking system illustrated in FIG. 1; and, FIG. 7 is a flow diagram illustrating the operation of the data processor illustrated in FIG. 6.

FIG. 6 is a block diagram of a controller 41 suitable for use in the lumber marking system illustrated in FIG. 1. The controller illustrated in FIG. 6 comprises: a master counter 131; a width counter 133; a marker pulse decoder 135; a data update pulse decoder 137; a width gate 139; and, a data processor 141. Also, illustrated in FIG. 6 is the operator's console 43. The train of pulses produced by the pulse generator 45, which denote increments of movement of the conveyor, are applied to the clock input of the master counter 131. As a result, the master counter, which is continuously enabled, is incremented each time a pulse is produced by the pulse generator. A second pulse train denoted as a lug pulse train are applied to the reset input of the master counter 131. Lug pulses are either produced by a separate pulse generator connected to the conveyor or by counting a predetermined number of pulses produced by the pulse generator 45. Regardless of how developed each lug pulse denotes that the conveyor has moved a distance equal to the spacing between a pair of adjacent lugs 15. Thus, the master counter 131 is reset each time the conveyor moves the distance between a pair of adjacent lugs 15.

Selected stages of the master counter 131 are connected to the marker pulse decoder 135 and the data update pulse decoder 137, which are depicted as simple AND gates for purposes of illustration. In reality, each of the decoders could be formed of a plurality of gates connected together in a predetermined manner so as to produce an output pulse when the master counter 131 has counted to a predetermined level. The output of the marker pulse decoder 135 is denoted MARKER PULSE and is applied to the data processor 141. The output of the data pulse decoder 137 is noted DATA UPDATE PULSE and is also applied to the data processor 141. The generation and use of these pulses is described in detail below.

The conveyor pulse train produced by the pulse generator 45 is also applied to one input of the width gate 139. The second or enable input of the width gate 139 is connected to the output of the photodetector of the width detector 47 illustrated in FIG. 1 and previously described. The width gate 139 is enabled by the output of the photodetector when the light beam directed toward the photodetector is broken by a board. Since the width gate 139 is only enabled when the photodetector light beam is broken by a board, the number of pulses counted by the width counter is directly related to the width of the board. The output of the width counter is a set of parallel binary signals denoted WIDTH DATA and is applied to the data processor 141. The data processor produces an output that is applied to the reset input of the width counter 133. When the data processor produces a RESET PULSE on this output the width counter 133 is reset.

In addition to width data, the data processor 141 also receives length data from the curtain of optical detectors 35. That is, as previously described, each time a board passes through the curtain of optical detectors certain of the optical detectors have their light beams broken. The number of broken light beams is directly related to the length of the board (in increments or segments). This data (which may be temporarily stored in a register prior to application to the data processor 141) is defined as the LENGTH DATA input of the data processor.

The data processor also receives the grade data (and any other board defining data) produced by the operator's console, which is denoted OPERATOR DATA in FIG. 6. Further, when the operator actuates a suitable switch (or generates a suitable code using the keyboard of the operator's console), a PRINT REQUEST PULSE is produced by the operator's console and applied to the data processor 141. The data processor produces two outputs that are applied to the operator's console 43. One output, denoted CLEAR PULSE, is applied to the operator's console to clear the register of the operator's console after the data stored in the register has been transferred to a suitable register or memory in the data processor 141. In addition, the data processor applies a TROUBLE PULSE to the operator's console 43 when certain conditions occur, such as one or more of the pneumatic actuators of the positioning mechanism not being in the commanded position when it should be in the commanded position, as discussed below.

The data processor produces a parallel output denoted MARKER POSITION CONTROL DATA, which comprises the signals on wires 118a–d, 120a–d and 122a–d. These signals are applied to the control inputs of the electrically operated pneumatic valves that control the position of the stack pneumatic actuators 101a–c, 102a–c, 103a–c and 104a–c in the manner previously described. Further, the data processor receives a series of signals denoted MARKER POSITION DATA representing the state of the stack actuator switches $S_1$—$S_1'''$, $S_2$—$S_2'''$ and $S_3$—$S_3'''$. The data processor also produces a MARKER STRIKE signal, which is applied via wire 116a to the input of valve 115a. Finally, the data processor produces PRINTER DATA signals for application to the printer 51 illustrated in FIG. 1.

Turning now to a general description of the operation of the controller illustrated in FIG. 6; a MARKER PULSE and a DATA UPDATE PULSE are produced during each sequence of operation of the master counter 131, i.e., between lug reset pulses. While the MARKER and DATA UPDATE PULSES could occur simultaneously, preferably, they are produced at different times. Moreover, while each MARKER PULSE could occur prior to a DATA UPDATE PULSE, preferably, the DATA UPDATE PULSE occurs prior to each MARKER PULSE. While the timings of the occurrence of DATA UPDATE PULSES is not particularly significant, if all input data is stored in register prior to being forwarded to the data processor, the timing of the occurrence of the MARKER PULSES is critical. Timing of the occurrence of MARKER PULSES is critical because each MARKER PULSE causes the data processor to produce a MARKER STRIKE signal on wire 116a that causes the pneumatic actuator 99 of the striking mechanism to drive the head 95 against the marking elements and emboss a code in the end of a board in the manner previously described. Timing of the MARKER PULSES is critical because the board must be aligned with the head when the pneumatic actuator is actuated as the result of the production of a MARKER PULSE. Contrariwise, a DATA UPDATE PULSE merely causes the data processor to read data produced by the various data sources. Obviously data forwarding can be done at any convenient time between or coincident with MARKER PULSES, provided registers are included to temporarily store the data.

As will be readily appreciated from viewing FIG. 1, the data that is forward by the various data sources when a DATA UPDATE PULSE occurs relates to different boards. That is, all of the data related to a particular board is not simultaneously generated. Rather, based on the layout illustrated in FIG. 1, grade data for each board is first generated by the operator's console 43. At some later point in time, illustrated as three board spaces from the operator console position where grade data is generated, the same board passes through the curtain of optical detectors where the length of the board is determined. Three board spaces later the same board passes through the width detector. Since the grade, length and width data related to each board is produced at spaced intervals, the related data must be collated. Collating of board data is controlled by DATA UPDATE PULSES. More specifically, each DATA UPDATE PULSE causes the data processor to read data in the manner previously described. In addition, each DATA UPDATE pulse causes previously read data to be advanced one position in a queue. The queue has a length adequate for the data to be collated so that the required data is available to control the operation of the stack pneumatic actuators (and, thus, the position of the marking elements) just prior to a MARKER PULSE causing the controller to drive the marking elements into the end of a board, as previously described. More specifically, each position in the queue first receives data only from the operator's console 43. This data is serially advanced one position in the queue as each DATA UPDATE PULSE occurs. When the operator's console data for a particular board has been advanced three positions, the board passes through the curtain of optical detectors 35. The length data determined by such passage is added to the queue position containing the operator's console data for the related board. The two items of data are now advanced together in the queue one position for each DATA UPDATE PULSE. Three positions later the same board passes through the width detector 47. The width data is now collated with the length and operator's console data for the related board and all three items are advanced together in the queue. Just prior to the related board reaching a position in alignment with the embossing mechanism 49, the three items of data related to the board are in the last position on the queue. This data is then used to control the position of the marking elements in the manner herein described.

Figure 7:
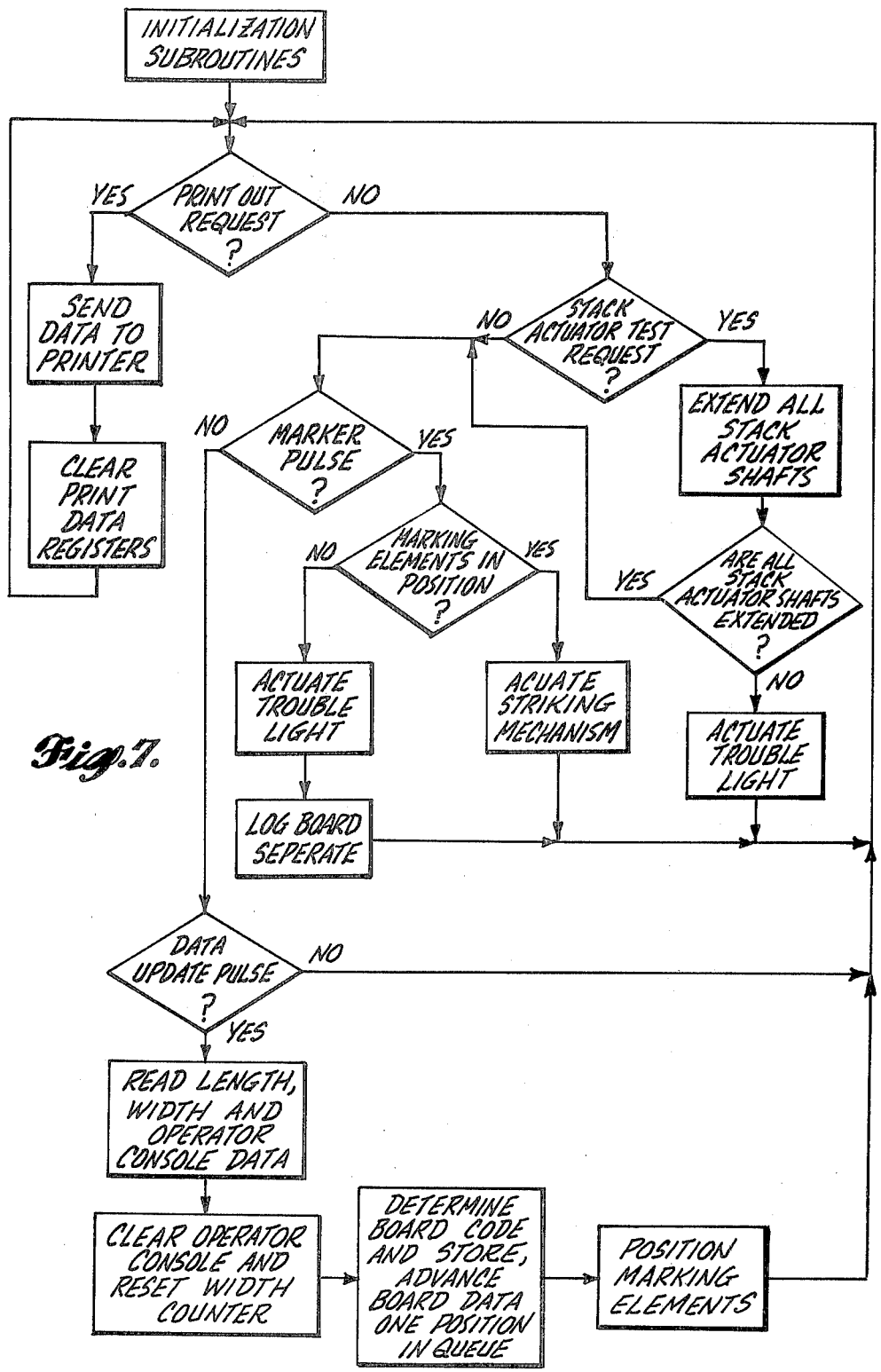

FIG. 7 is a flow diagram illustrating the operation of a data processor suitable for use in the controller illustrated in FIG. 6. (It should be noted that the data processor includes all necessary subsystems, such as a central processing unit, clock, memories such as random access memories and read only memories, etc.) When power is first applied to the data processor, a series of standard initialization subroutines are performed during which registers are zeroed, internal tests are performed to determine whether or not the data processor is functioning correctly, etc. After the initialization subroutines are completed, which also may be automatically performed at predetermined intervals, during the normal operation of the data processor, a test is made to determine whether or not a printout request is present, which may be made by the operator via the operator console 43, for example. If a printout request is present, PRINTER DATA stored in printer data registers, a random access memory (RAM) or other suitable storage device forming part of the data processor is sent to the printer. The PRINTER DATA may be specific board data or accumulated data about the boards, such as the number of boards of a particular grade, length, width or volume, that have passed through the lumber marking system prior to the last printout request, for example. In any event, after the PRINTER DATA has been forwarded to the printer, the storage device, e.g., the printer data registers, are cleared and the data processor cycles back to the point where the test was made to determine whether or not a printout request was present.

When no printout request is present, a test is made to determine whether or not a stack actuator test request is present. A stack actuator test may be requested by the operator generating a suitable code via the keyboard of the operator console, or by the operator closing a stack actuator test switch, for examples. Alternatively a periodic stack actuator test request may be automatically programmed into the operation of the data processor. Regardless of how produced, if a stack actuator test request is present, all of the pneumatic actuators $101a$–$c$, $102a$–$c$, $103a$–$c$ and $104a$–$c$ of the positioning mechanism are commanded to extend their shafts. As a result, all of the slide blocks $73a$–$c$ are raised to their maximum position (whereat all of the zero marker elements 77 are aligned with the head 95). In this position all of the pneumatic actuator switches $S_1$—$S_1'''$, $S_2$—$S_2'''$ and $S_3$—$S_3'''$ are closed. After all of the positioning mechanism pneumatic actuators (i.e., all of the stack actuators) have been commanded to extend their shafts, a test is made to determine whether or not all of the shafts are extended. This is done be determining if all of the pneumatic actuator switches are closed. If the test is failed, i.e., one or more of the pneumatic actuator switches is determined to be open, a TROUBLE PULSE is sent to the operator's console causing the actuation of a trouble light. Thereafter, the data processor cycles back to the point where printout test request is made.

If the stack actuator test is passed, i.e., all of the pneumatic actuator switches are determined to be closed, or if no stack actuator test has been requested, a test is made to determine whether or not a MARKER PULSE is present on the output of the marker pulse decoder 135. If a MARKER PULSE is not present, a test is made to determine whether or not a DATA UPDATE PULSE is present on the output of the data update pulse decoder 137. If a DATA UPDATE PULSE is not present the data processor cycles back to the point where a printout request test is made.

If a DATA UPDATE PULSE is present on the output of the data update pulse decoder 137, the length, width and operator's console data are all read and added to the queue, as previously described. The queue data may be stored in the memory of the data processor or in registers, for examples. Thereafter, a CLEAR PULSE is applied to the operator's console and a RESET PULSE is applied to the width counter via the appropriate wires, discussed above. Using the data in the last queue position, the data processor determines the code to be embossed into the next board to be aligned with the embossing mechanism 49. The code may, for example, include a digit representing the grade of the board and two digits representing its volume based on the length and width data generated by the invention, assuming a fixed thickness. Alternatively, the operator may enter thickness data via the operator's console, or the thickness may be measured by a suitable thickness measuring device. After the code has been determined, the board data is advanced one position in the queue. Then, the marking elements are positioned.

If the marker pulse test indicated that a MARKER PULSE was present on the output of the marker pulse decoder 135, a test is made to determine whether or not the marking elements are in the commanded position. This test is performed by comparing the pneumatic actuator switch $S_1$—$S_1'''$, $S_2$—$S_2'''$ and $S_3$—$S_3'''$ closed and open states with the commanded pneumatic actuator positions. If the switch states indicate that the marking elements are in the commanded positions, the striking mechanism 65 is actuated. Since MARKER PULSES are coincident with board alignment with the embossing mechanism 49, the appropriate code is embossed into the end of the aligned board. Contrariwise, if the marking elements are not in the commanded position, a TROUBLE PULSE is sent to the operator's console to ignite the trouble light. In addition, flag data is stored in the data processor printer memory noting that the related board should be logged separately. This log data is printed out when the next printout request occurs. Thereafter, the data processor cycles back to the point where a printout request test is made.

As will be readily appreciated from the foregoing description, the invention provides a lumber marking system that is suitable for use as a separate system or in conjunction with lumber milling apparatus such as a trimming saw system, which may be presently in use. The invention is particularly suitable for use in environments wherein individual boards must be marked. In this regard, the invention is most ideally suited for use in environments where the individual boards vary in size or grade on a piece-by-piece basis whereby an individual code must be developed for, and marked on, each board.

In addition to providing a lumber marking system, the invention comprises a new and improved embossing mechanism that is ideally suited for use in the lumber marking system. That is, the embossing mechanism is ideally suited for control by an automatic control system to mark boards on a piece-by-piece basis. While the embossing mechanism is ideally suited for use in the lumber marking system of the invention, it can also be used in other types of lumber marking systems. Moreover, the embossing mechanism can be used to mark items other than lumber. Similarly, while the lumber marking system is ideally suited for use in environments where piece-by-piece marking is required, it can also be utilized to mark pieces of uniform size and/or grade by continuously producing the same code. Still further the lumber marking system can be utilized to mark only one, or a selected number, of a series of similar boards, or used in other ways familiar to those skilled in the lumber marking art. Consequently, the invention can be practiced otherwise than as specifically described herein.

The embodiments of the invention in which an exclusive property or privilege is claimed are defined as follows:

1. A lumber marking system for accumulating information about pieces of lumber and marking the lumber with a related code, said lumber marking system comprising:

conveying means for conveying pieces of lumber on a piece-by-piece basis;

an operator's console, located adjacent to said conveyor means, for an operator, observing pieces of lumber conveyed by said conveyor means, to generate operator data signals related to said observations;

dimension means, associated with said conveying means, for determining the dimensions of pieces of lumber conveyed by said conveying means and producing related dimension data signals, said dimension means including length means for determining the length of said pieces of lumber moved by said conveying means and producing related length data signals, said length means including a curtain of length switches, said dimension means also including width means for determining the width of said pieces of lumber moved by said conveyor means and producing related width data signals, said length and width data signals forming said dimension data signals;

accumulating means coupled to said operator's console and said dimension means for accumulating said operator data signals and said dimension data signals for each piece of lumber as said pieces of lumber are moved by said conveyor means, collating said operator data signals and said dimension data signals for each piece of lumber and producing lumber marking control signals in accordance therewith; and marking means, located adjacent said conveying means, downstream of said operator's console and said dimension means, and coupled to said accumulating means, for receiving said lumber marking control signals and marking said pieces of lumber with a code in accordance with said lumber marking control signals.

2. A lumber marking system as claimed in claim 1 wherein said length switches comprise optical detector elements each of which includes a light source and a light detecting element.

3. A lumber marking system as claimed in claim 2 wherein said width means comprises an optical detector element having a light beam broken by each piece of lumber as said pieces of lumber are moved by said conveyor means, a pulse generator for generating pulses at a rate related to the rate of movement of said conveyor means and a counting means for counting pulses during the period of time said light beam is broken by each piece of lumber.

4. A lumber marking system for accumulating information about pieces of lumber and marking the lumber with a related code, said lumber marking system comprising:

conveying means for conveying pieces of lumber on a piece-by-piece basis;

an operator's console, located adjacent to said conveyor means, for an operator, observing pieces of lumber conveyed by said conveyor means, to generate operator data signals related to said observations;

dimension means, associated with said conveying means, for determining the dimensions of pieces of lumber conveyed by said conveying means and producing related dimension data signals, said dimension means including length means for determining the length of said pieces of lumber moved by said conveying means and producing related length data signals and width means for determining the width of said pieces of lumber moved by said conveyor means and producing related width data signals, said width means includes: (i) an optical detector element having a light beam broken by each piece of lumber as said pieces of lumber are moved by said conveyor means; (ii) a pulse generator for generating pulses at a rate related to the rate of movement of said conveyor means; and, (iii) a counting means for counting pulses during the period of time said light beam is broken by each piece of lumber, said length and width data signals forming said dimension data signals;

accumulating means coupled to said operator's console and said dimension means for accumulating said operator data signals and said dimension data signals for each piece of lumber as said pieces of lumber are moved by said conveyor means, collating said operator data signals and said dimension data signals for each piece of lumber and producing lumber marking control signals in accordance therewith; and, marking means, located adjacent said conveying means, downstream of said operator's console and said dimension means, and coupled to said accumulating means, for receiving said lumber marking control signals and marking said pieces of lumber with a code in accordance with said lumber marking control signals.

5. A lumber marking system for accumulating information about pieces of lumber and marking the lumber with a related code, said lumber marking system comprising:

conveying means for conveying pieces of lumber on a piece-by-piece basis;

an operator's console, located adjacent to said conveyor means, for an operator, observing pieces of lumber conveyed by said conveyor means, to generate operator data signals related to said observations;

dimension means, associated with said conveying means, for determining the dimensions of pieces of lumber conveyed by said conveying means and producing related dimension data signals, said dimension means including length means for determining the length of said pieces of lumber moved by said conveying means and producing related length data signals and width means for determining the width of said pieces of lumber moved by said conveyor means and producing related width data signals, said length and width data signals forming said dimension data signals;

accumulating means including a data processor, said data processor coupled to said operator's console and said dimension means for: (i) sequentially accumulating in a queue said operator data signals and said dimension data signals for each piece of lumber as said pieces of lumber are moved by said conveyor means; (ii) collating said operator data signals and said dimension data signals for each piece of lumber; and, (iii) producing lumber marking control signals in accordance therewith, previously accumulated data being advanced one position in said queue each time new data is acquired by said queue; and, marking means, located adjacent said conveying means, downstream of said operator's console and said dimension means, and coupled to said accumulating means, for receiving said lumber marking control signals and marking said pieces of lumber with a code in accordance with said lumber marking control signals.

6. A lumber marking system for accumulating information about pieces of lumber and marking the lumber with a related code, said lumber marking system comprising:
- (A) conveying means for conveying pieces of lumber on a piece-by-piece basis;
- (B) an operator's console, located adjacent to said conveyor means, for an operator, observing pieces of lumber conveyed by said conveyor means, to generate operator data signals related to said observations;
- (C) dimension means, associated with said conveying means, for determining the dimensions of pieces of lumber conveyed by said conveying means and producing related dimension data signals, said dimension means including length means for determining the length of said pieces of lumber moved by said conveying means and producing related length data signals and width means for determining the width of said pieces of lumber moved by said conveyor means and producing related width data signals, said length and width data signals forming said dimension data signals;
- (D) accumulating means coupled to said operator's console and said dimension means for accumulating said operator data signals and said dimension data signals for each piece of lumber as said pieces of lumber are moved by said conveyor means, collating said operator data signals and said dimension data signals for each piece of lumber and producing lumber marking control signals in accordance therewith; and,
- (E) marking means, located adjacent said conveying means, downstream of said operator's console and said dimension means, and coupled to said accumulating means, for receiving said lumber marking control signals and marking said pieces of lumber with a code in accordance with said lumber marking control signals, said marking means including an embossing mechanism comprising:
  - (1) a plurality of adjacent columns of individually movable marking elements;
  - (2) pneumatic means for individually positioning each column of marking elements such that a predetermined array of marking elements are aligned with the plane of movement of the boards moved by said conveying means, said predetermined array being in accordance with said lumber marking control signals, and,
  - (3) pneumatically actuated striking means also located in alignment with said plane of movement of said boards for moving said marking elements into a marking position when said pneumatically actuated striking means is actuated, said pneumatically actuated striking means being actuated by said accumulating means.

7. A lumber marking system as claimed in claim 6 wherein each of said marking elements includes a raised type font.

8. A lumber marking system as claimed in claim 7 wherein said pneumatically actuated striking means moves said marking elements into a marking position by driving said fonts of said marking elements into said boards to create an embossed code therein.

9. A lumber marking system as claimed in claim 6 wherein said pneumatic means for individually positioning said columns of marking elements each includes a vertical stack of pneumatic actuators mounted one atop the other such that each pneumatic actuator raises both the actuators between it and the associated column of marking elements, and the column of marking elements, when said pneumatic actuator is actuated.

10. A lumber marking system as claimed in claim 9 wherein each of said columns of marking elements includes a slide block in which said marking elements are mounted, said slide blocks connected to the shaft of the upper one of said stacks of pneumatic actuators.

11. A lumber marking system as claimed in claim 10 including an electro-pneumatic control system for controlling the actuation of said pneumatic actuators forming said stacks of pneumatic actuators and, thus, the position of said slide blocks and, hence, said marking elements.

12. A lumber marking system as claimed in claim 10 wherein said pneumatic actuators forming said stacks of pneumatic actuators are controlled such that the shafts of said pneumatic actuators are either fully extended or fully retracted.

13. A lumber marking system as claimed in claim 12 including detecting means for detecting when said shafts of said pneumatic actuators of said stacks of pneumatic actuators are fully extended.

* * * * *